W. H. SITTS.
RESILIENT VEHICLE WHEEL.
APPLICATION FILED FEB. 28, 1917.
1,323,794. Patented Dec. 2, 1919.
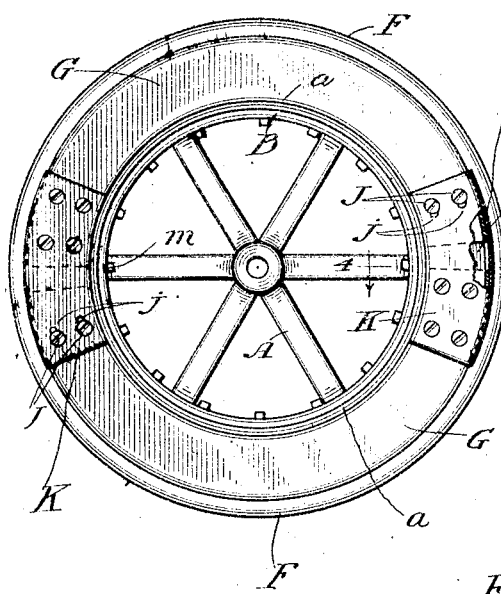
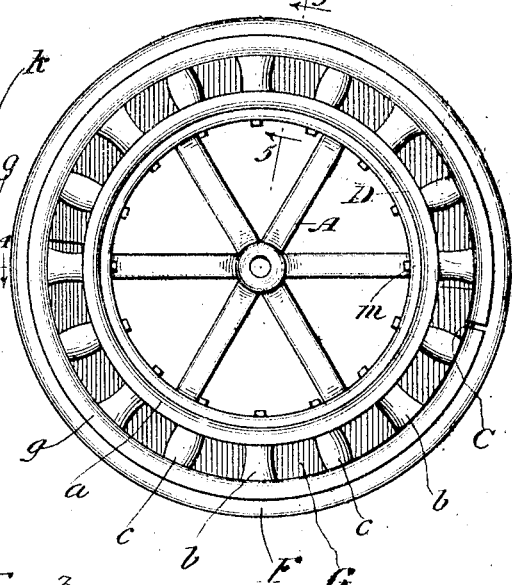
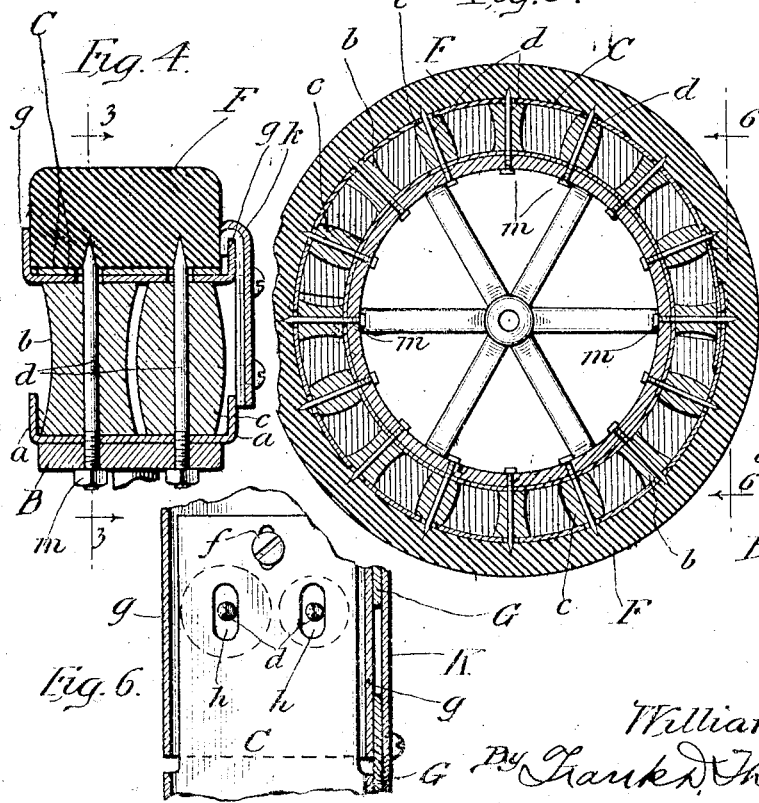
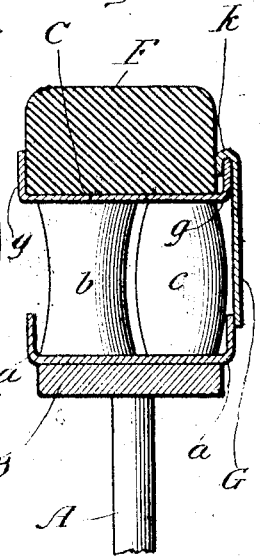
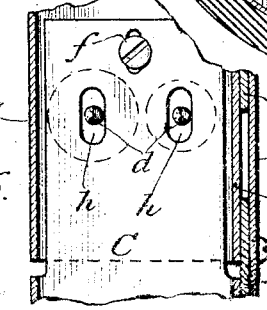
Inventor:
William H. Sitts
By Frank D. Thomas Atty.

UNITED STATES PATENT OFFICE.

WILLIAM H. SITTS, OF CHICAGO, ILLINOIS.

RESILIENT VEHICLE-WHEEL.

1,323,794. Specification of Letters Patent. Patented Dec. 2, 1919.

Application filed February 28, 1917. Serial No. 151,387.

*To all whom it may concern:*

Be it known that I, WILLIAM H. SITTS, a citizen of the United States, residing at Chicago, in the county of Cook and State of Illinois, have invented new and useful Improvements in Resilient Vehicle-Wheels, of which the following is a full, clear, and exact description.

My invention relates to wheels, and particularly to resilient wheels for motor driven vehicles.

The object of my invention is to provide means for making the solid rubber tired wheels for trucks resilient, and whenever the resiliency at any particular point of the circumference of the wheel diminishes, to restore such resilience in a quick and simple manner. This I accomplish in the manner hereinafter fully described, and as particularly pointed out in the claims.

In the drawings:

Figure 1 is a side view of my invention, part being broken away to show the structure of the outer rim.

Fig. 2 is a view of the opposite side of the same.

Fig. 3 is a longitudinal section thereof.

Fig. 4 is a transverse section taken on dotted line 4—4, Fig. 1, drawn to an enlarged scale.

Fig. 5 is a view similar to Fig. 4 taken on dotted line 5—5, Fig. 2.

Fig. 6 is a fragmentary view showing a portion of the outer circumference of the outer rim.

Referring to the drawings, A represents a suitable wheel having two concentric rims. The inner rim B is, preferably, made of solid metal and the edges of its outer flat circumference are provided with outwardly projecting flanges *a, a*.

The outer rim C is of greater circumference than rim B and is separated and spaced apart from the inner rim by a series of uniformly spaced rubber cushions *b* and *c*, which latter are arranged in equi-distant pairs and are retained in position by radial bolts *d, d*, the inner portions of which are screw-threaded. The screw-threaded portions of these bolts are screwed into the inner rim and the smooth portions thereof extend outwardly through cushions *b* and *c*, and through slotted openings in the outer rim C until the outer pointed ends thereof project through said outer rim a sufficient distance to enter the inner periphery of the continuous solid tire F seated in the same.

The outer rim is, preferably, not made in one continuous piece, but its ends are made to lap past one another and are fastened together by means of a series of screws or bolts *f, f*, that are tapped into the covered end and extend out through longitudinally elongated holes *h* in the outer superposed end. The longitudinal edges of the outer rim between their lapped end portions are provided with outwardly projecting flanges *g, g*, and said outer rim is kept concentric with the axis of wheel A by means of semi-circular plates G, G, which are of such width that when in proper position they close the space between the inner and outer rims on the outside of the wheel. The outer circumferential edges *k* of these plates G are bent laterally and then inward to form a circumferential groove in which the adjacent flange *g* of the outer rim is seated when said plates are in their assembled position. Plates G, G, are held in said assembled position by segmental fish-plates K, K, one end of each of which latter is securely bolted to one end of one plate G and has its opposite end lap past the contiguous end of the other plate G and secured thereto by bolts or screws J, J, that pass through longitudinally elongated slots *j, j*, in one of said lapped ends and screw into the others.

The wheels, constructed as hereinbefore described, not only permit of a certain amount of vertical resiliency, but also permit of a certain amount of yield circumferentially of the wheel. This avoids not only the wear of the tire due to the vertical pounding of the tire, but avoids the tearing of the same due to coming in contact with sharp objects in the road as the wheels move forward.

Cushions *b* and *c* are, as hereinbefore stated, arranged in pairs. One cushion *b* of each pair is concaved between its ends and the other cushion *c* is convexed, and these cushions are arranged so that the convexed cushion in one pair will be at the right hand and the concaved cushion will be at the left hand and in the next pair the relative position of the convexed and concaved cushions will be just the reverse. This staggered arrangement of the convexed and concaved cushions results in a greater resiliency than if all of said cushions were convexed or if all were concaved. If some of these cushions should become weakened and yield more than the others as they move beneath the axis of the wheel, bolts $d$, $d$, can be easily removed and new cushions substituted therefor, and the bolts again inserted in position to retain the substituted cushion or cushions in place.

If desired, the inner screw-threaded ends of the screws or bolts $d$ may be extended and suitable lock-nuts $m$ screwed onto the same so as to lock said bolts and prevent their coming loose or voluntarily unscrewing from the inner rim.

What I claim as new is:

1. A resilient wheel, comprising an unbroken inner rim, a split outer rim, resilient material spacing said rims apart, and means for maintaining the curvature of said outer rim, comprising semi-circular plates whose outer edges are connected to said outer rim and whose ends are secured together for limited relative movement.

2. A wheel of the kind specified having an inner and an outer concentric rim, rubber cushions interposed between and spacing said rims apart and arranged in pairs one of each pair being convexed and the other concaved between its ends, and a continuous solid rubber tire seated on the periphery of the outer rim.

3. A wheel of the kind specified having an inner and an outer concentric rim, rubber cushions inserted between and spacing said rims apart, a continuous solid rubber tire seated in the circumference of the outer rim, and radial bolts the inner ends of which are removably secured in the inner rim and pass through said cushions and extend through the outer rim into the inner periphery of said tire.

4. A wheel of the kind specified having a continuous inner rim and an outer concentric rim, rubber cushions inserted between and separating said rims, a solid rubber tire seated in said outer rim, and radial bolts suitably secured in said inner rim and extending through enlarged openings in said outer rim and into the inner circumference of said tire.

5. A wheel of the kind specified having a continuous inner rim, an outer rim, said rim having overlapping ends, screws that pass through enlarged openings in one of said overlapping ends and screw into the other, rubber cushions inserted between and separating said rims, a solid rubber tire seated in said outer rim, and radial bolts suitably secured in said inner rim and extending through said cushions through enlarged openings in said outer rim and into the inner circumference of said tire.

6. A wheel of the kind specified, having an inner rim, and a split outer rim the ends of which are arranged so that they overlap and have a limited sliding movement against each other, rubber cushions interposed between and spacing said rims apart, a solid rubber tire seated in the outer circumference of the outer rim and substantially semi-circular plates engaging and slidingly connecting the ends of said outer rim.

In witness whereof I have hereunto set my hand this 24th day of January, 1917.

WILLIAM H. SITTS.

Witnesses:
 FRANK P. SITTS,
 FRANK D. THOMASON.